(12) United States Patent
Gmirya et al.

(10) Patent No.: US 7,100,468 B2
(45) Date of Patent: Sep. 5, 2006

(54) SPLIT TORQUE GEARBOX

(75) Inventors: Yuriy Gmirya, Woodbridge, CT (US); Harsh Vinayak, Meriden, CT (US); David Andrew Binney, Beacon Falls, CT (US); Lawrence Mark Zunski, Seymour, CT (US); Vincent F. Millea, Stratford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 355 days.

(21) Appl. No.: 10/740,375

(22) Filed: Dec. 18, 2003

(65) Prior Publication Data
US 2005/0132833 A1 Jun. 23, 2005

(51) Int. Cl.
*F16H 57/00* (2006.01)
(52) U.S. Cl. .............. 74/410; 74/423; 74/664
(58) Field of Classification Search .............. 74/410, 74/416, 417, 420, 421 R, 423, 424.5, 665 F, 74/664
See application file for complete search history.

(56) References Cited

U.S. PATENT DOCUMENTS

| | | | | |
|---|---|---|---|---|
| 5,472,386 A | * | 12/1995 | Kish | 475/338 |
| 5,807,202 A | * | 9/1998 | Sammataro | 475/336 |
| 5,813,292 A | * | 9/1998 | Kish et al. | 74/665 C |
| 6,612,195 B1 | * | 9/2003 | Gmirya et al. | 74/416 |
| 2004/0211278 A1 | * | 10/2004 | Gmirya et al. | 74/410 |
| 2004/0214682 A1 | * | 10/2004 | Sbabo | 475/220 |

* cited by examiner

*Primary Examiner*—David Fenstermacher
(74) *Attorney, Agent, or Firm*—Carlson, Gaskey & Olds

(57) ABSTRACT

A split torque gearbox having multiple input shafts. Each input shaft is connected to two face gears. Each face gear is connected to two quill shafts, one is coaxially mounted and the second is not coaxially mounted. Of the two quill shafts, one is positioned on a first side of an output stage and a second quill shaft is located on a second side of the output stage and the quill shafts are connected thereto. The output stage is connected to a main shaft.

26 Claims, 2 Drawing Sheets

SPLIT TORQUE GEARBOX

This invention was made with government support under Contract No. DAAH10-01-2-0032 awarded by the Department of the Army. The government therefore has certain rights in this invention.

BACKGROUND OF THE INVENTION

1. Technical Field

This invention generally relates to a drive train. More specifically, this invention relates to a high speed transmission gear box. The gear box allows engine power to be transferred from a high-speed engine to a low speed output shaft. The power transferred is distributed to flexible quill shafts. Although this gearbox is primarily designed for a helicopter drive system, it can be used in any field where a light-weight and high reduction ratio gearbox is required.

2. Background Information

Requirements for transporting increased payloads over greater distances at increased speed may require larger aircraft that may be more expensive because of the correspondingly larger and heavier components.

As more power is required from an aircraft, aircraft engines may have to be larger and heavier. The consequences of larger engines may include: increases in the size and weight of the aircraft, increases in the size and weight of the blades, and increases in the size and weight of power transfer components to handle the increased engine power. Weight increases which may be necessary to handle the increased engine output may reduce the power to weight ratio of the aircraft.

Additionally, conventional designs may not simply be "scaled up" past a certain power input. If the components are simply designed to match the proportional increase in power or "scaled", the weight of the components may increase in a non-linear manner. To continue the evolution of the helicopter, designers require ways which minimize or stop component weight increase relative to power output increase. Specifically, gearboxes may not be increased using "scaled up" conventional designs without significant modification to the entire system which may increase the overall cost of the helicopter.

A need therefore exists for improved helicopter components, including a new gearboxes and transmissions that overcome the aforementioned shortcomings.

SUMMARY OF THE INVENTION

The present invention overcomes the foregoing disadvantages of the prior art by providing a split torque gearbox.

The split torque gearbox has an input shaft coaxially connected to the engine output shaft. The input shaft is connected matingly to two face gears. A first stage or input stage includes the input shaft and two face gears. Bach face gear is connected to a shaft that is connected to a flexible linkage that turns a pinion so that the pinion and face gear rotate at the same frequency about the same axis. The pinion is matingly connected to an output stage gear so that as the face gear rotates, the pinion causes the output stage gear to rotate. On the shaft is mounted a split pinion that mates with a split gear so that as the face gear rotates both the split pinion and split gear rotate at the same rate. The split gear is connected to a flexible linkage that turns a pinion connected to the output stage gear. The pinion is matingly connected to an output face gear causing the output face gear to rotate about an axis. The output face gear is connected to a main shaft that is coaxially mounted with the output face gear so that the main shaft and the output face gear rotate at the sane rate.

Additional advantages of the invention are set forth in the detailed description herein, or will be apparent to those of ordinary skill in the art. Also it should be appreciated that modifications and variations to the specifically illustrated and discussed embodiments and uses of this invention may be practiced without departing from the spirit and scope thereof, by virtue of present reference thereto. Such variations may include but are not limited to, substitution of equivalent parts, parts with equivalent functions, or multiple pieces so that the device has the same function for those shown or discussed.

For a fuller understanding of the nature and objects of the invention, reference should be made to the following detailed description taken in connection with the accompanying drawings, which illustrate, by way of example, the principles of the invention.

BRIEF DESCRIPTION OF THE DRAWINGS

The preferred embodiment of the invention, illustrative of the best mode in which the applicants have contemplated applying the principles, are set forth in the following description and shown in the drawings and are particularly and distinctly pointed out and set forth in the appended claims.

Similar numerals refer to similar parts throughout the drawings.

DESCRIPTION OF THE PREFERRED EMBODIMENT

The detailed description of the present invention is given for explanatory purposes. It will be apparent to those skilled in the art that numerous changes and modifications can be made without departing from the scope of the invention. Accordingly, the whole of the description is to be construed in an illustrative and not a limitative sense. The scope of the present invention is to be limited only to the extent of the claims that follow.

There is a drive throughout the aerospace industry to increase the strength and durability of aerospace products while significantly reducing the weight of the product and increasing the performance. This may be a vicious cycle whereby, as power and space requirements are increased, larger and larger components are required to handle the additional torque and stress. The larger components require more space and add extra weight to the aircraft, thereby diminishing the performance of the upgraded product.

Because the extra weight and size eat into the performance requirements of the aircraft, the aircraft, components and requirements must be resized to account for the new components. Thus, the cycle is repeated.

Figure 1:
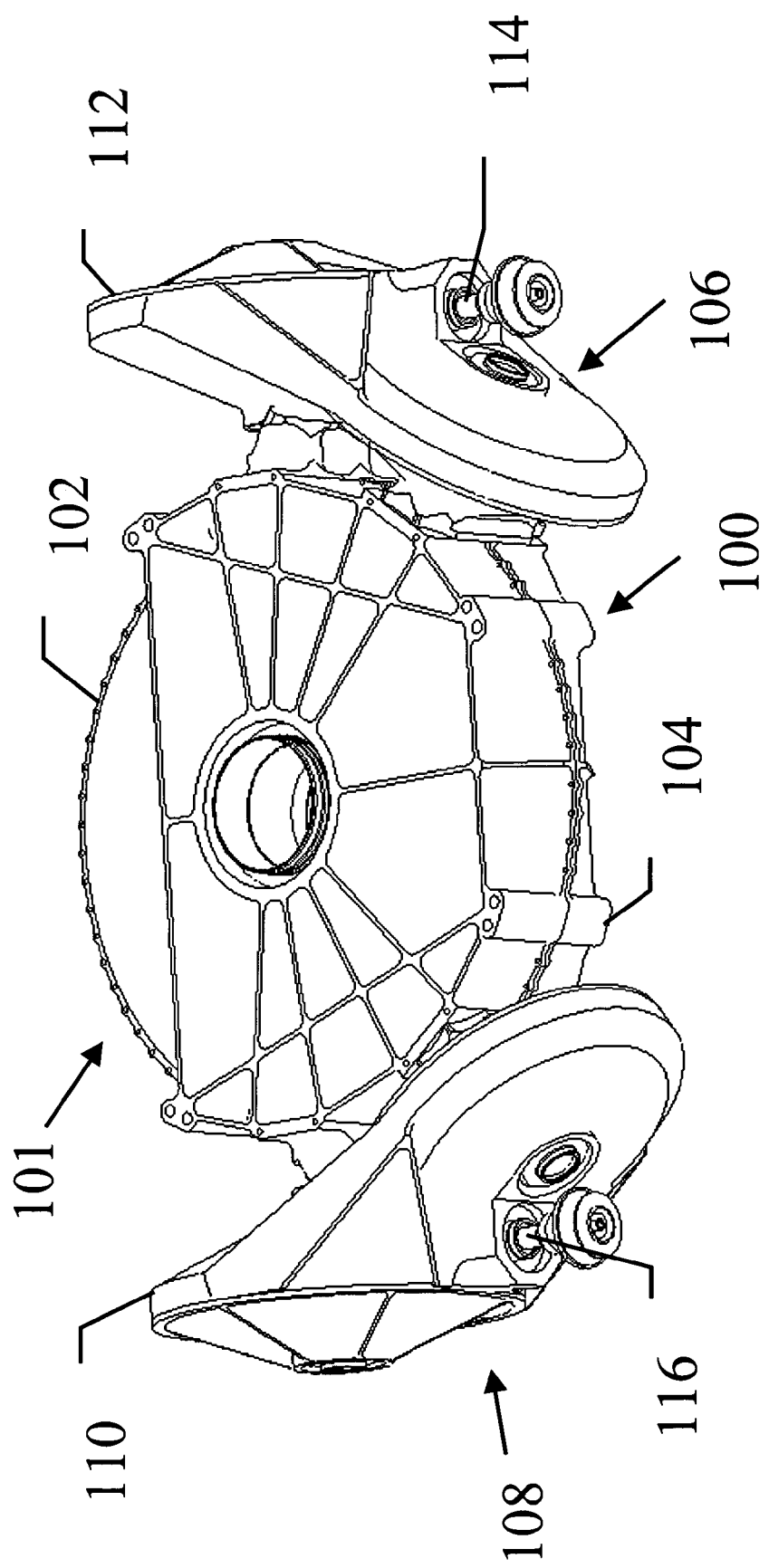
FIG. 1 is a perspective view of a face gear power train.

The present invention was developed in an effort to reduce the weight of components while increasing their performance. One embodiment of this invention, depicted in FIG. 1, shows a multistage face gear power train 100 that is a significant reduction in size from the prior art while increasing the amount of torque that can be transferred from the engine to a rotor and power take off (PTO) device(s). The face gear power train 100 has two output stage covers 102 and 104 located on a first and second side of the output stage 101 (FIG. 1). First stages 106 and 108 mechanically linked to the output stage 101 are located in the first stage housings 110 and 112 that structurally support the input shafts 114 and 116 and the face gears (not shown in FIG. 1).

Figure 2:
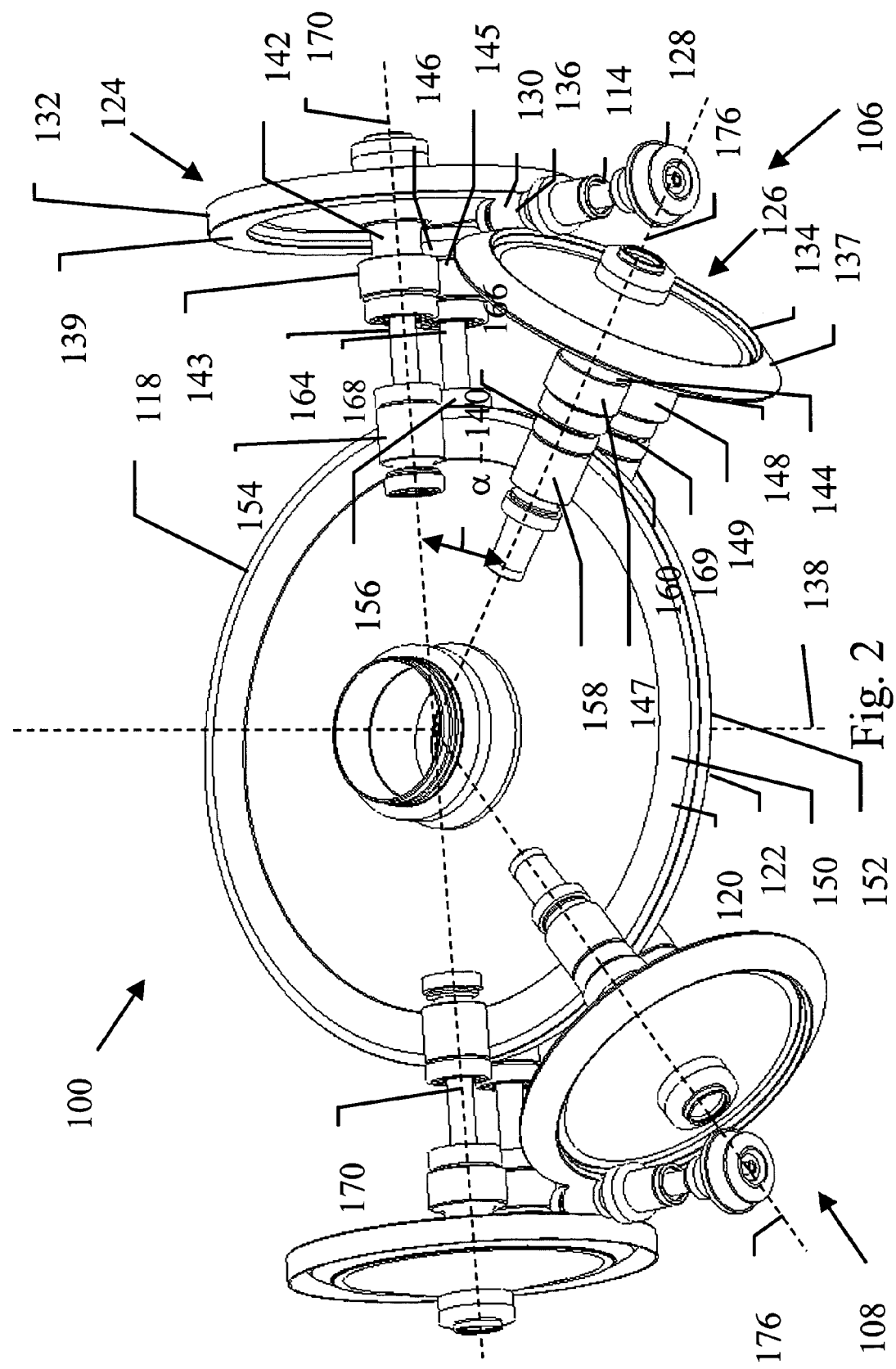
FIG. 2 is a perspective view of a face gear power train with the covers removed.

Referring now to FIG. 2, which shows the face gear power train 100 with covers 102 and 104, and housings 110 and 112 of FIG. 1 removed, one can clearly see the basic parts of the face gear power train. The power train 100 includes first stages 106 and 108 and output stage gear or bull gear 118. Referring to first stage 106, the first stage includes an input shaft 114, a primary stage 124 and a secondary stage 126. The input shaft 114 has two ends. There is a coupling 128 at the first end of the input shaft 114 for attaching the power train to the engine output (not shown). At a distal second end is at least one pinion 130. The pinion 130 has teeth 136 that engage teeth 137 and 139 on the primary face gear 132 and secondary face gear 134.

The primary face gear 132 is rotatably mounted along radial axis 170. Axis 170 runs along a line drawn from the main shaft axis 138 to the center of the face gear 132. Similarly, the secondary face gear 134 is rotatably mounted along radial axis 176. Axis 176 runs along a line drawn from the main shaft axis 138 to the center of the secondary face gear 134. There is an angle α 140 between axis 170 and axis 176. That angle α 140 is between 20–120 degrees with a preferred range between 30 and 60 degrees. However, in some applications, single engine or otherwise, these angles may range from 5 degrees to less than 180 degrees. By beveling the secondary face gear or the primary gear, rotational movement from input shaft 114 can be transferred to rotational movement in secondary face gear 134 and primary face gear 132 at the same time without any additional linkage.

Both face gears 132 and 134 are connected to coaxial upper shafts 142 and 144 respectively. The upper shaft 142 is preferably directly connected to the primary face gear 132 and matingly connected to a top side 120 of output stage gear 118 through a flexible linkage 164 and a pinion 154. The upper shaft 142 and pinion 154 rotate with primary face gear 132. Upper shaft 142 rotates about radial axis 170. Preferably, upper shaft 142 is linked to a split pinion 143. The split pinion 143 drives split gear 145. Split gear 145 is connected to lower shaft 146. The lower shaft 146 preferably is linked to a coaxial pinion 156 through flexible linkage 168 mounted at an end distal from the mounted split gear 145. Alternatively the split pinion 143 may be part of face gear 132. In either case, split gear 145 is connected to a bottom side 122 of output stage gear 118 through pinion 156. Because pinion 154 and pinion 156 rotate in opposite directions on opposite sides of the output stage gear 118, output stage gear 118 rotates in one direction from input on both sides of stage gear 118.

The primary stage 124 and secondary stage 126 have similar construction. The upper shaft 144, directly connected to the secondary gear 134 and connected to a top side 120 of output stage gear 118 through a pinion 158 and flexible linkage 166, rotates with secondary gear 134. The upper shaft 144 rotates about radial axis 176. A lower shaft 148 is connected to the secondary gear 134 through split pinion 147 and split gear 149 so that as the face gear 134 rotates, both pinions 158 and 160 rotate in opposite directions. Preferably, lower shaft 148 has split gear 149 attached so that split pinion 147 drives split gear 149. At an end distal from split gear of shaft 148 is flexible linkage 169 which is connected to pinion 160. The split gear 149 and lower shaft 148 are connected to a bottom side 122 of output stage gear 118 through the pinion 160 and flexible linkage 169. Because the upper shaft 144 and lower shaft 148 rotate in opposite directions on opposite sides of the output stage gear 118, output stage gear 118 rotates in one direction from input on both sides.

First stage 108 operates in a similar manner. Thus, as a result of two first stages, torque imparted on input shafts 114 and 116, is split into eight different paths. By splitting the torque load into eight paths, the peak amount of force required to be handled by each pinion is a fraction of conventional systems. This allows many things in the system to be downsized so that it is less expensive to build and repair. For instance, the teeth 150 located near the rim 152 on both sides of the output stage gear 118 can be downsized and need to handle less force individually even though the same amount of torque is still imparted to the output stage gear 118. Additionally, there is a space savings over other prior art devices that transferred equivalent loads. Also, there is a redundancy in the system so that even if one part in the path from the face gear to the output gear fails, the other seven or even other six paths can be economically designed and built to transfer the load. It is within the scope of this invention to have varying numbers of stages resulting in more or less paths.

The face gear power train should utilize symmetry as often as possible for many reasons including load balance, reduced cost, ease of design, ease of repair, simpler design, and noise reduction.

At least one object of the invention is achieved by having provided face gears described above. The high reduction capability of the face gears preferably in the range of 7:1 to 12:1 allow the reduction of the number of stages in the face gear power train. In the preferred embodiment of the invention, the high reduction ratio capability allows a transmission to use only two stages versus the prior art devices that had at least three stages. Additionally, the preferred embodiment of the invention eliminates the use of planetary gearboxes. The use of planetary gearboxes are expensive and very complicated, thus making the manufacture and repair of the planetary transmissions costly and provide low reliability.

In operation, an engine creates torque through an output shaft. In the preferred embodiment of the invention, the output shaft is connected to input shaft 114 with a flexible coupling 128. Because of misalignment (relative gearbox to engine movement), the flexible coupling is preferred. The rotational energy from the engine is transferred to the input shaft 114. The input shaft rotates causing the pinion 130 to rotate. The pinion 130 engages the primary and secondary gears 132 and 134. The face gears 132 and 134 rotate causing the upper shafts to rotate. As the upper shafts rotate causing flexible linkages to rotate which in turn cause pinions to rotate and turn output stage gear 118. Each upper shaft, preferably having a split pinion 143 and 147 linked to each shaft, causes the split gears 145 and 149 to rotate. The rotation of the split gears 145 and 149 causes the lower shafts 146 and 148 to rotate. The lower shafts turn flexible linkages 168 and 169 and pinions 156 and 160 to rotate causing output stage gear 118 to rotate. The pinions on the top of the output stage gear 118 rotate in a first direction. The pinions on the bottom of the output stage gear 118 rotates in a second direction. The rotation of the pinions transfers the torque to the output stage gear 118. As the output stage gear 118 rotates, the main shaft rotates turning the blades of the helicopter.

Preferably, flexible linkages 164, 166, 168 and 169 are quill shafts so that loads within the system are better distributed and equalized. The use of quill shafts allow for less precision in the grinding of gears than that afforded by a traditional planetary gearbox approach. By reducing the precision required in the manufacturing process, the overall cost to build and use the system is reduced. The quill shafts are a preferred embodiment of the invention. Additionally, if at least one part of shaft 142, 144, 146 or 148, pinion 154, 156, 158 or 160, or flexible linkage 164, 166, 168 or 169 fails to operate in the designed manner, the torque transferred through that path will be redistributed to the other shafts and pinions and linkages so that the total power transferred by the stage allows the aircraft to continue to operate.

Further yet, it should be understood that the foregoing relates only to a preferred embodiments of the present invention, and that numerous changes and modifications may be made therein without departing from the spirit and scope of the invention as defined in the following claims.

We claim:

1. A multistage face gear power train comprising:
an output stage having an output stage gear connected to a main shaft and two first stages with each first stage comprising an input shaft having a first end and a second end where the first end is connected to an engine through a coupling and the second end is connected to at least one pinion in meshed engagement with two face gears, each face gear is connected to at least one pinion in meshed engagement with the output stage gear.

2. A multistage face gear power train according to claim 1, wherein the two face gears rotate about separate axes that are separated by angle α.

3. A multistage face gear power train comprising:
an output stage having an output stage gear connected to a main shaft and two first stages with each first stage comprising an input shaft having a first end and a second end where the first end is connected to an engine through a coupling and the second end is connected to at least one pinion in meshed engagement with two face gears, each face gear is connected to at least one pinion in meshed engagement with the output stage gear wherein the two face gears rotate about separate axes that are separated by angle α, said angle α less than 180 degrees.

4. A multistage face gear power train according to claim 2, wherein angle α is between 30 and than 60 degrees.

5. A multistage face gear power train according to claim 1, wherein each face gear is coaxial to an upper shaft.

6. A multistage face gear power train according to claim 5, wherein the coaxial upper shaft is connected to a split pinion.

7. A multistage face gear power train according to claim 6, wherein each split pinion is matingly connected to a split gear.

8. A multistage face gear power train according to claim 7, wherein each split gear is linked to the pinion driving the stage gear through flexible linkage.

9. A multistage face gear power train according to claim 8, wherein flexible linkage comprises a quill shaft.

10. A multistage face gear power train having an output stage having an output stage gear and an input stage having an input shaft with a coaxially mounted pinion that drives a primary and secondary stage face gears, separated by an angle α which is between 40 and 65 degrees, each face gear coaxially mounted on an upper shaft, the upper shaft being connected to a pinion for driving the output stage gear on a first side of the output stage gear, and a split pinion that drives a split gear which is connected to a pinion for driving the output stage gear on a second side.

11. A multistage face gear power train according to claim 10, wherein the connections between the split pinion and pinion and split gear and pinion are quill shafts.

12. A multistage face gear power train according to claim 11, wherein the multistage face gear power train is connected to an engine by an input shaft with a flexible coupling.

13. A multistage face gear power train comprising an output stage have an output stage gear connected to a main shaft and a first stage having an input shaft connected to a pinion that drives a primary stage and secondary stage, each primary stage and secondary stage having two torque transmission paths for driving the output stage gear said primary stage and said secondary stage separated by an angle α less than 180 degrees.

14. A multistage face gear power train according to claim 13, wherein the primary stage and secondary stage each have a face gear and an upper path and lower path for transmitting torque to the output stage gear.

15. A multistage face gear power train according to claim 14, wherein the upper path comprises a shaft, a flexible linkage and output pinion said shaft defined about an axis transverse to a main shaft axis of rotation.

16. A multistage face gear power train according to claim 15, wherein each upper path has a split pinion that drives a split gear connected to the lower path.

17. A multistage face gear power train according to claim 14 wherein the lower path comprises a shaft, a flexible linkage and output pinion.

18. A multistage face gear power train according to claim 17, wherein an alternative power path is available should one of the upper and lower path becomes inoperable to redistribute torque to continue aircraft operation.

19. A multistage face gear power train according to claim 14, wherein the multistage face gear comprises multiple first stages.

20. A multistage face gear power train according to claim 1, wherein the two face gears rotate about separate axes that are each transverse to a main shaft axis of rotation.

21. A multistage face gear power train according to claim 1, wherein the two face gears rotate about separate axes that are separated by angle α, said separate axes each transverse to a main shaft axis of rotation.

22. A multistage face gear power train comprising:
an output stage having an output stage gear and an input stage having an input shaft with a coaxially mounted pinion that drives at least one face gear, wherein said at least one face gear is coaxially mounted on a first shaft, said first shaft connected to a first pinion for driving said output stage gear on a first side, and a split pinion that drives a split gear which is connected to a second pinion on a second shaft, said second pinion drives said output stage gear on a second side opposite said first side.

23. A multistage face gear power train according to claim 22, wherein said output stage gear drives a main rotor shaft about a main rotor shaft axis of rotation, said first pinion rotatable about a first axis and said second pinion rotatable about a second axis, said first axis and second axis each transverse to said main rotor shaft axis of rotation.

24. A multistage face gear power train according to claim 23, wherein said first axis and second axis are generally parallel.

25. A multistage face gear power train according to claim 22, wherein said at least one face gear includes a first face gear and a second fact gear which each rotate about separate axes that are separated by angle α defined between said first axis defined by said first pinion and a second axis defined by an axis of rotation of said second face gear, said angle α less than 180 degrees.

26. A multistage face gear power train according to claim 25, wherein said first axis and said second axis are each transverse to a main rotor shaft axis of rotation defined by said output stage gear.

* * * * *

UNITED STATES PATENT AND TRADEMARK OFFICE
CERTIFICATE OF CORRECTION

PATENT NO. : 7,100,468 B2 Page 1 of 1
APPLICATION NO. : 10/740375
DATED : September 5, 206
INVENTOR(S) : Gmirya et al.

It is certified that error appears in the above-identified patent and that said Letters Patent is hereby corrected as shown below:

Column 8, line 10: "fact" should be --face--

Signed and Sealed this

Fifth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 7,100,468 B2  Page 1 of 1
APPLICATION NO. : 10/740375
DATED : September 5, 2006
INVENTOR(S) : Gmirya et al.

It is certified that error appears in the above-identified patent and that said Letters Patent is hereby corrected as shown below:

Column 8, line 10: "fact" should be --face--

This certificate supersedes Certificate of Correction issued December 5, 2006.

Signed and Sealed this

Second Day of January, 2007

JON W. DUDAS
*Director of the United States Patent and Trademark Office*